United States Patent
Martin et al.

(10) Patent No.: US 9,956,447 B2
(45) Date of Patent: May 1, 2018

(54) PERFLUOROALKYL FUNCTIONALIZED POLYACRYLAMIDE FOR ALCOHOL RESISTANT-AQUEOUS FILM-FORMING FOAM (AR-AFFF) FORMULATION

(71) Applicant: Tyco Fire & Security GmbH, Neuhausen am Rheinfall (CH)

(72) Inventors: Thomas Joseph Martin, Mansfield, TX (US); Ming Li, Mansfield, TX (US)

(73) Assignee: TYCO FIRE & SECURITY GMBH (CH)

( * ) Notice: Subject to any disclaimer, the term of this patent is extended or adjusted under 35 U.S.C. 154(b) by 188 days.

(21) Appl. No.: 14/430,905

(22) PCT Filed: Sep. 25, 2013

(86) PCT No.: PCT/US2013/061552
§ 371 (c)(1),
(2) Date: Mar. 24, 2015

(87) PCT Pub. No.: WO2014/052369
PCT Pub. Date: Apr. 3, 2014

(65) Prior Publication Data
US 2015/0251035 A1      Sep. 10, 2015

Related U.S. Application Data

(60) Provisional application No. 61/705,580, filed on Sep. 25, 2012.

(51) Int. Cl.
| | | |
|---|---|---|
| A62D 1/02 | (2006.01) |
| C08F 2/38 | (2006.01) |
| C08F 220/56 | (2006.01) |
| C08L 33/16 | (2006.01) |
| C08L 33/26 | (2006.01) |
| C08G 63/688 | (2006.01) |
| C08F 220/06 | (2006.01) |
| C08F 220/24 | (2006.01) |
| C08F 220/54 | (2006.01) |
| C08F 220/58 | (2006.01) |
| C08F 4/04 | (2006.01) |

(52) U.S. Cl.
CPC ............ *A62D 1/0085* (2013.01); *C08F 2/38* (2013.01); *C08F 220/56* (2013.01); *C08G 63/688* (2013.01); *C08L 33/16* (2013.01); *C08L 33/26* (2013.01); *C08F 4/04* (2013.01); *C08F 220/06* (2013.01); *C08F 220/24* (2013.01); *C08F 220/54* (2013.01); *C08F 2220/585* (2013.01)

(58) Field of Classification Search
CPC .......................... A62D 1/0042; A62D 1/0085
See application file for complete search history.

(56) References Cited

U.S. PATENT DOCUMENTS

| | | |
|---|---|---|
| 5,218,021 A | 6/1993 | Clark et al. |
| 5,750,043 A | 5/1998 | Clark |
| 6,521,730 B1 * | 2/2003 | Pabon ............... A62D 1/0085 526/243 |
| 7,592,405 B2 | 9/2009 | Otaguro et al. |

FOREIGN PATENT DOCUMENTS

| | | |
|---|---|---|
| GB | 2 311 219 A | 9/1997 |
| WO | WO 2011/062292 A1 | 5/2011 |

OTHER PUBLICATIONS

International Search Report, International Application No. PCT/US2013/061552 (published under WO 2014/052369), dated Jan. 21, 2014.

* cited by examiner

*Primary Examiner* — Peter F Godenschwager
(74) *Attorney, Agent, or Firm* — Perkins Coie LLP

(57) ABSTRACT

New high molecular weight fluoropolymers (fluoropolymer surfactants) are provided that are useful in compositions for use as fire extinguishing concentrates. The fluoropolymers contain $C_4$-$C_6$ perfluoroalkyl groups, and substantially lack perfluoroalkyl groups containing more than 6 fluorine-substituted carbon atoms.

25 Claims, 1 Drawing Sheet

Surface Tension Vs. Concentration for [FPS-1].
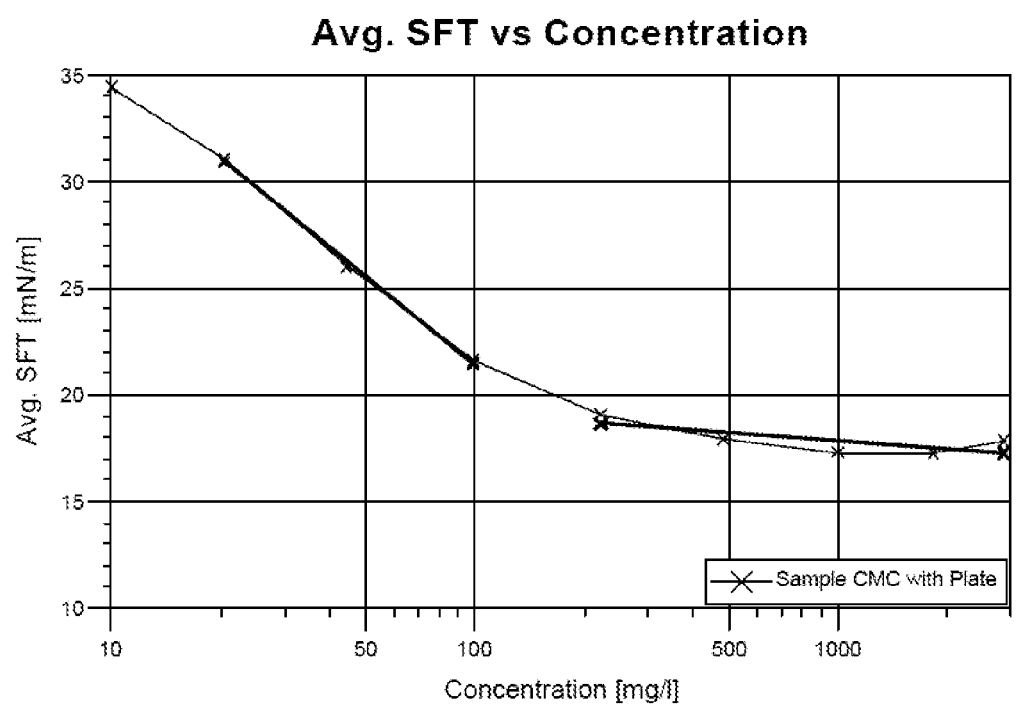

PERFLUOROALKYL FUNCTIONALIZED POLYACRYLAMIDE FOR ALCOHOL RESISTANT-AQUEOUS FILM-FORMING FOAM (AR-AFFF) FORMULATION

PRIORITY CLAIM & INCORPORATION BY REFERENCE

This application is a 35 U.S.C. § 371 application of International Application No. PCT/US2013/061552, filed Sep. 25, 2013, which claims the benefit of priority to U.S. Provisional Patent Application No. 61/705,580, filed Sep. 25, 2012, each of which applications is incorporated by reference in its entirety.

BACKGROUND

Firefighting foam concentrates contain mixtures of surfactants that act as foaming agents, together with solvents and other additives that provide the desired mechanical and chemical properties for the foam. The concentrates are mixed with water in situ and foamed by mechanical means, and the resulting foam is projected onto the fire, typically onto the surface of a burning liquid. The concentrates are typically used at a concentration of about 1-6%.

Aqueous film-forming foam (AFFF) concentrates are designed to spontaneously spread an aqueous film on the surface of hydrocarbon liquids, which increases the rate at which the fire can be extinguished. This spreading property is made possible by the use of perfluoroalkyl surfactants in AFFF, which produce very low surface tension values in solution (15-20 dynes cm$^{-1}$), thereby permitting the aqueous solution to spread on the surface of the hydrocarbon liquids.

However, typical AFFF foams are not effective on fires caused by water-miscible fuels, such as low molecular weight alcohols, ketones, and esters and the like, because the miscibility of the fuel and water in the foam leads to dissolution and destruction of the foam by the fuel. To address this issue, alcohol resistant AFFF (AR-AFFF) concentrates are used, which contain a high molecular weight water-soluble polymer that precipitates on contact with a water-miscible fuel, creating a protective layer between the fuel and the foam.

Typical high molecular weight water-soluble polymers used in AR-AFFF are polysaccharides, such as xanthan gums. AR-AFFF foams are effective on both hydrocarbon and water-soluble fuels. However, the high concentrations of polysaccharide gums necessary to make an effective AR-AFFF concentrate can cause the concentrate to be so thick that the concentrate is difficult to pump efficiently, and therefore can cause proportioning problems during foam generation and application. The use of certain fluoropolymer surfactants has the same polar fuel performance as xanthan gums, but with much lower viscosity increase. See, for example, U.S. Pat. No. 6,156,222. Therefore, a significant portion of the gum can be replaced by fluoropolymer surfactants to give better AR-AFFF performance.

Until recently, aqueous film forming foams that were used for fire fighting invariably contained components, including low molecular weight fluorosurfactants and fluoropolymer surfactants having perfluoroalkyl chains where the perfluoroalkyl group was at least a perfluorooctyl group. For example, it was believed that a surfactant required at least a perfluorooctyl moiety to provide the necessary physicochemical attributes for efficient and persistent foam formation for fire fighting applications. See WO03/049813. However, perfluorooctyl moieties have been shown to be environmentally persistent and to accumulate in the livers of test animals, leading to calls for the phase-out of materials, including foam components, containing a perfluorooctyl group. Recent regulatory efforts such as the United States EPA's PFOA Stewardship Program and EC directives pertaining to telomer-based higher homologue perfluorinated surfactants have sought to discourage use of perfluorooctyl-containing components.

Although $C_6$ fluorosurfactants have been reported to be satisfactory for less demanding applications, such as cleaning solutions, the reduction in length of the perfluoroalkyl chain unfortunately leads to a decrease in the ability to form long lasting persistent foams with the properties necessary for effective fire fighting. Thus, AFFF and AR-AFFF concentrates where the perfluorooctyl surfactant is replaced by an equivalent $C_6$ compound typically are unable to meet the requirements of the US and international standards for fire fighting applications.

SUMMARY OF THE INVENTION

High molecular weight fluoropolymer surfactants are provided that contain $C_4$-$C_6$ perfluoroalkyl groups. The surfactants are particularly useful in aqueous film-forming foam (AFFF) compositions, and especially alcohol resistant-AFFF (AR-AFFF) compositions, for lowering surface tension without the need for perfluorooctyl($C_8$)-containing surfactants. Methods for making the fluoropolymers are provided, as well as foam concentrates containing the fluoropolymers. Foams made from the concentrates have surprisingly high performance on burning polar fuels, meeting UL 162 and EN-1568 requirements.

Specifically, there is provided a fluoropolymer having the formula I

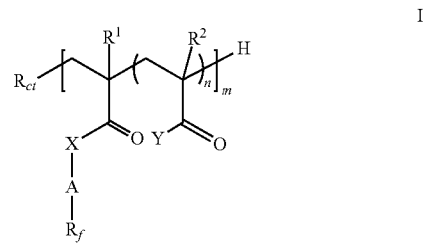

where $R_f$ is a $C_4$-$C_6$ perfluoroalkyl group, A is a bivalent linker moiety, $R_{ct}$ is a chain transfer agent, $R^1$ is H or methyl, $R^2$ is H or methyl, X is NH or O, Y is $NH_2$ or OR, where R is H or lower alkyl, n is 10-50, and m is 5-100. The fluoropolymer advantageously has a molecular weight between at least about 10,000 Da and about 100,000 Da, although the skilled artisan will recognize that fluoropolymers having molecular weights outside this range also are useful.

In one embodiment, either $R^1$ or $R^2$, or both, are H. In these and other embodiments, X is NH and/or Y is $NH_2$.

In these and further embodiments A may be $C_1$-$C_{12}$ alkyl optionally interrupted with —S— or —O—, for example, A may be —$(CH_2)_{1-6}$—S—$(CH_2)_{1-6}$—, such as —$(CH_2)_2$—S—$(CH_2)_2$—.

In these and other embodiments, $R_{ct}$ may be an alkyl mercaptan, an aralkyl mercaptan, a perfluoroalkyl alkyl mercaptan, an alkyl halide, an aralkyl halide, or a perfluoroalkyl alkyl halide. By way of non-limiting example, $R_{ct}$ may be $C_1$-$C_6$ alkylthio or Rf—$(CH_2)_{2-6}$—S—.

In any of the embodiments described above, $R_f$ may be perfluorohexyl.

In a particular embodiment, $R_f$ may be perfluorohexyl, A may be —$(CH_2)_2$—S—$(CH_2)_2$—, $R_{cf}$ may be Rf—$(CH_2)_2$—S—, $R^1$ and $R^2$ may be H, X may be NH, and Y may be $NH_2$.

Also provided are aqueous firefighting composition concentrates that contain an effective amount of one or more fluoropolymers as described above, where the composition is substantially free of any surfactant containing a perfluoroalkyl group containing more than 6 carbon atoms. Such compositions are highly effective for forming firefighting foams and can, for example, comply with the standard set forth in EN 1568-3.

The compositions described above may further contain an effective amount of one or more components selected from the group consisting of: an amphoteric hydrocarbon surfactant, an anionic hydrocarbon surfactant, a nonionic hydrocarbon surfactant, a $C_6$ fluorochemical surfactant, a foam aid, a freeze protection composition, a composition comprising ion sequestering, buffer, and anti-corrosion components, a polymeric film forming composition, a biocide and antimicrobial composition, an electrolyte composition, and a polysaccharide gum thickener.

The composition may contain an amphoteric hydrocarbon surfactant in an amount from 0-3% w/w, an anionic hydrocarbon surfactant in an amount of about 2-20% w/w, a nonionic hydrocarbon surfactant in an amount of 0-5% w/w, a $C_6$ fluorochemical surfactant in an amount of 0-0.4% w/w, a foam aid in an amount of 0-15% w/w, and/or a freeze protection composition in an amount of 0-45% w/w. The composition may contain ion sequestering, buffer, and anti-corrosion components in a total amount of 0-5% w/w. The composition may also contain a polymeric film forming composition in an amount of 0-2%, and/or biocides and/or antimicrobials in an amount up to 0.1% w/w. Other components of the composition may include electrolytes in an amount of 0-3% w/w, and/or at least one polysaccharide gum thickener in an amount of 0-10% w/w. The composition may include an effective amount of magnesium sulfate.

Also provided are fire-fighting foams, where the foams contain a fluoropolymer as described above or are prepared from a composition as described above.

Further provided are methods of making a fire-fighting foam, where the methods include foaming a composition as described above with an aqueous liquid. The aqueous liquid may be, for example, water, brackish water, or seawater.

Also provided are methods of fighting a fire, where the methods include comprising contacting a fire with a foam prepared as described above, or prepared from a composition as described above.

In addition there are provided methods of making a fluoropolymer of formula I as described above, where the methods include the step of reacting together a chain transfer agent, a compound of formula II:

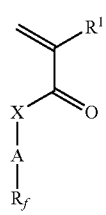

and a compound of Formula III

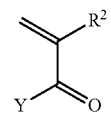

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 shows a CMC curve for fluoropolymer FPS-1.

DETAILED DESCRIPTION

New high molecular weight fluoropolymers (fluoropolymer surfactants, or HMW-FPs) are provided that are useful in compositions for use as fire extinguishing concentrates. The fluoropolymers contain $C_4$-$C_6$ perfluoroalkyl groups, and lack perfluoroalkyl groups containing more than 6 fluorine-substituted carbon atoms. Compositions prepared using the fluoropolymers may be used to prepare AR-AFFF foams having low viscosity and low surface tension while maintaining a surprisingly high level of fire extinguishing performance. In particular, addition of small amount of these fluoropolymers to fire-fighting concentrates allows a reduction in the concentration of high molecular weight polysaccharide gums while providing enhanced performance on burning polar fuels, meeting UL 162 and EN-1568 requirements. The addition of the fluoropolymers also significantly reduces the viscosity of the concentrates, which facilitates proportioning of the concentrate during foam production. Fire-fighting concentrates containing the fluoropolymers can be prepared with or without additional low molecular weight fluorosurfactants, but the presence of low molecular weight fluorosurfactants may be used to improve extinguishing speed and burnback times. Also provided are methods of extinguishing Class A and Class B fires using fire-fighting concentrates containing the fluoropolymers. The methods provide fast extinguishment and high resistance to burn back.

HMW-FPs have lower toxicity compared to low molecular weight fluorochemical surfactants. In fact, it is much easier to list polymers (non-reactive) on the TSCA inventory than low molecular weight materials. Similarly, in Europe, polymers are exempt from the EINICS list. It is widely understood that as polymers increase in MW, their absorption rate through skin decreases. Further, high MW polymers rapidly adsorb to solid surfaces such as dirt, rocks, etc, and are much less available for entering water ways. Therefore, they are in general more environmentally benign than low MW surfactants and chemicals.

Structure of the Fluoropolymers

The fluoropolymers have a structure where a polymeric backbone is prepared that bears environmentally friendly $C_4$-$C_6$ perfluoroalkyl pendent groups. The polymers substantially lack perfluoroalkyl groups longer than $C_6$. The commercial synthesis of perfluoroalkyl compounds tends to produce a range of products containing $C_4$, $C_6$, $C_8$, $C_{10}$ and longer perfluoroalkyl groups and these products must then be physically separated. This separation tends to produce $C_4$ and $C_6$ perfluoroalkyl compounds that contain small amounts of longer perfluoroalkyl compounds. These small amounts are difficult to completely remove but do not significantly affect the properties of the $C_4$ or $C_6$ molecule. In the context of the fluoropolymers, it will be understood that a polymer substantially lacks perfluoroalkyl groups longer than $C_6$ when less than about 1% of the perfluoroalkyl groups are longer then $C_6$.

The fluoropolymers have the general formula I

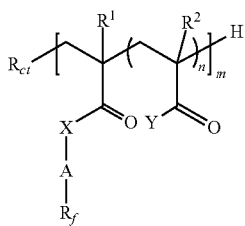

where
$R_f$ is a $C_4$-$C_6$ perfluoroalkyl group;
A is a bivalent linker moiety;
$R_{ct}$ is a chain transfer agent;
$R^1$ is H or methyl;
$R^2$ is H or methyl;
X is NH or O;
Y is $NH_2$, NHR, or OR, where R is $C_1$-$C_3$ alkyl;
n is 10-50; and m is 5-100.

The perfluoroalkyl group can be a straight or branched chain perfluoroalkyl group, but typically is straight chain perfluorobutyl or perfluorohexyl group. The bivalent linker moiety A can be any moiety that stably links $R_f$ and the X moiety. Ideally the bivalent linker A contains a straight or branched hydrocarbyl chain containing 1 to 12 carbon atoms. The hydrocarbyl chain advantageously may be interrupted by a heteroatom such as S or O, which facilitates synthesis of the pendant perfluoroalkyl chains of the fluoropolymers. Advantageously, when Rf is $C_4$, A contains at least 8 methylene groups, and when Rf is $C_6$, A contains at least 4 methylene groups, although the skilled artisan will recognize that more or fewer methylene groups can be present. In specific embodiments A is —$(CH_2)_{1-6}$—S—$(CH_2)_{1-6}$—, for example —$(CH_2)_2$—S—$(CH_2)_2$—. Without being bound by theory, it is believed that the presence of a non-fluorinated hydrophobic moiety linking $R_f$ and A permits the use of shorter perfluoroalkyl moieties than previously has been the case. In particular, the use of extended chains of 2, 4, 6, 8 or 10 methylene groups between Rf and A allows the polymer to retain the required hydrophobic properties while minimizing the length of the perfluoroalkyl moiety. In addition, not only does this permit the use of shorter perfluoroalkyl moieties in the polymers, but it also allows the polymers, and the resulting polymer-containing compositions, to have a lower overall fluorine content without sacrificing the desired hydrophobicity.

Both $R^1$ and $R^2$ may independently be H or methyl, although advantageously both are H. The polymer side chain functionalities may independently be either amide or ester functionalities, that is X may be NH or O, and Y may be $NH_2$, NHR, or OR, where R is lower alkyl. For circumstances where stability against hydrolysis is important, the side chains advantageously are amides, i.e. X is NH and Y is $NH_2$ or NHR, more specifically X is NH and Y is $NH_2$.

The chain transfer agent can be any functional group that can act to terminate polymerization on a growing polymer chain, and it therefore acts as a modulator or regulator of the polymerization process. Specifically, the chain transfer agent can be any molecule with a weak chemical bond that can react with the growing polymer chain and terminate the chain propagation. The skilled artisan will recognize that a wide variety of chain transfer agents can be used, including alkyl chloride, bromide or iodide, and alkyl and aryl thiols. More specific examples of suitable chain transfer agents include an alkyl mercaptan, an aralkyl mercaptan, a perfluoroalkyl alkyl mercaptan, an alkyl halide, an aralkyl halide, or a perfluoroalkyl alkyl halide.

An increase in the concentration of the chain transfer agent will quench the growth of the individual polymer chains more quickly and, accordingly, lead to a lower average molecular weight of the product. Conversely, a lower concentration of chain transfer agent leads to a higher average molecular weight of the polymer. In this fashion, the concentration of the chain transfer agent can be varied to obtain a desired average molecular weight of the polymer. In the context of the polymers described above, the chain transfer agent advantageously is $C_1$-$C_6$ alkylthio or Rf—$(CH_2)_{2-6}$—S—, but the skilled artisan will recognize that the nature of the agent is not limited to these examples.

In a particularly advantageous embodiment, the fluoropolymer has a structure where $R_f$ is perfluorohexyl, A is —$(CH_2)_2$—S—$(CH_2)_2$—, $R_{ct}$ is $R_f$—$(CH_2)_2$—S—, $R^1$ and $R^2$ are H, X is NH, and Y is $NH_2$. The skilled artisan will recognize, however, that the fluoropolymers as described herein are not limited to this particular embodiment.

The average molecular weight (weight average molecular weight) of the polymer advantageously is at least about 10,000 Da, although lower average molecular weights also can be used. In addition, the fluoropolymer advantageously has an average molecular weight less than 100,000 Da, although higher average molecular weights also can be used, provided that the polymer remains water soluble but insoluble in polar fuels, such as alcohols, ketones, and esters, and the like.

Synthesis of the Fluoropolymers
Monomer Preparation

The fluoropolymer may be synthesized by copolymerization of a perfluoroalkyl functionalized acrylic acid derivative and a non-functionalized acrylic acid derivative in the presence of a chain transfer agent. The latter acrylic acid derivative (for example acrylamide, methacrylamide, methyl acrylate, ethyl acrylate, acrylic acid or methacrylic acid) is readily available from commercial suppliers, such as Sigma Aldrich (St. Louis, Mo.). Similarly, suitable chain transfer agents such as alkyl halides, aralkyl halides, perfluoroalkyl alkyl halides, alkyl mercaptans, and aralkyl mercaptans, also are commercially available from a variety of sources.

When the chain transfer agent is a perfluoroalkyl alkyl mercaptan, the reagent may or may not be commercially available, but may be synthesized in a straightforward manner from readily available starting materials, such as a perfluoroalkyl alkyl halide, via treatment with thiourea, followed by reaction with an amine. The reaction scheme shown below is illustrative, and the skilled artisan will recognize that this scheme, or other schemes well known in the art, can be used to make perfluoroalkyl alkyl mercaptans with a variety of chain lengths:

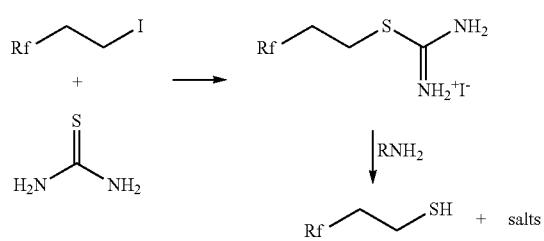

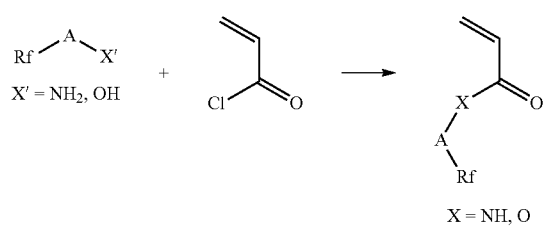

Perfluoroalkyl functionalized acrylic acid derivatives are readily prepared by the reaction of a suitable amine or alcohol with an acryloyl chloride:

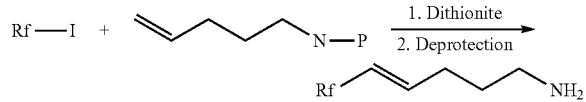

Methods for synthesizing suitable starting amine and alcohols are well known in the art. For example, where A is an alkylene or alkenylene chain, suitable amines and alcohols are commercially available or are readily prepared from commercially available starting materials such as perfluoroalkyl ethyl iodide or perfluoroalkyl ethyl alcohols. These starting materials can readily be converted into chain-extended amines and alcohols by straightforward methods of forming extended alkylene and alkenylene chains, such as nucleophilic iodide displacement at the terminal carbon of perfluoroalkyl ethyl iodide, or olefination reaction of the aldehyde derived from perfluoroalkyl ethyl alcohols. Also, dithionite-catalyzed addition of perfluorobutyl or perfluorohexyl iodide to double bonds is a well known method of forming alkyl and alkene chains carrying perfluoroalkyl moieties:

Hydrogenation gives the unsaturated product.

A more convenient manner of preparing chain-extended amine and alcohol starting materials is via nucleophilic displacement of a leaving group on a perfluorohexyl or perfluorobutyl substituted molecule with a heteroatom such as oxygen or sulfur. Thus, for example, displacement of iodide in perfluorohexyl ethyl iodide with an amino substituted mercaptan proceeds efficiently to directly provide an amino thioether:

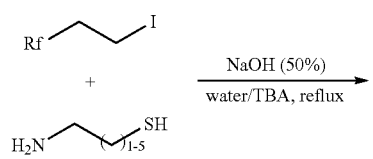

-continued

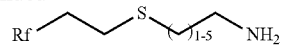

The resulting amine (or alcohol) is then coupled to an acryloyl chloride as described above:

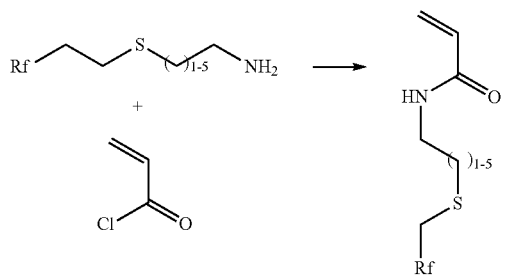

Polymerization

The resulting functionalized acrylamide (or acrylate) monomer is copolymerized with acrylamide (or other suitable acrylic acid derivative, as described above) in the presence of a chain transfer agent and a suitable polymerization initiator. Suitable initiators are well known in the art and include commercially available azo-type and peroxide-type compounds, for example, dicyclohexyl peroxydicarbonate, benzoyl peroxide or di-tert-butyl peroxide. The reaction temperature of the polymerization can be varied as needed and may be between 0° C. and 150° C., though typically the reaction temperature is conveniently set at the reflux temperature of the reaction solvent (such as, for example, t-butanol, isopropyl alcohol or various glycols and glycol ethers) and advantageously is between about 60° C. and 90° C.

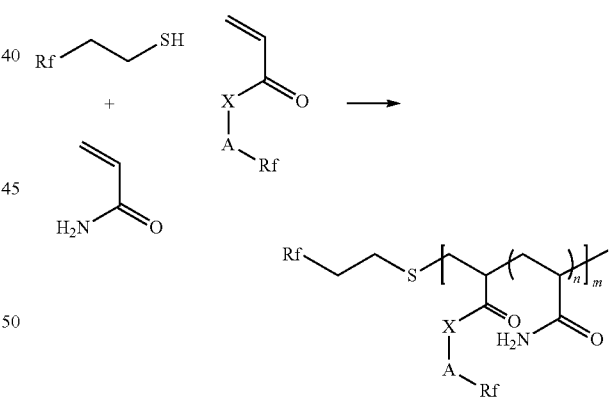

The molecular weight of the polymer can be modified by adjusting the relative molar ratio of chain transfer agent as described above, and the relative ratio of acrylamide and perfluoroalkyl functionalized acrylamide side chains in the polymer can be adjusted by modifying the relative ratio of the respective monomers used in the reaction.

Compositions Containing the Fluoropolymers

The fluoropolymer as described above can be used to prepare aqueous firefighting composition concentrates that are effective for preparing alcohol-resistant aqueous film-forming foams. Specifically, the fluoropolymer can be used to prepare AR-AFFF concentrates where the concentrate composition is substantially free of any surfactant containing a perfluoroalkyl group containing more than 6 carbon atoms. AR-AFFF concentrates containing fluoropolymers are known in the art and the fluoropolymers described herein can be used to replace some or all of the fluoropolymers used in the concentrates known in the art. See for example, U.S. Pat. No. 7,011,763, the contents of which are hereby incorporated by reference in their entirety.

Concentrates prepared from the fluoropolymers described herein are useful for extinguishing UL162 Class B polar (water soluble) and non-polar (water insoluble) liquid fuel fires. The concentrates also meet the standards set forth in EN 1568-3 an EN 1568-4. Methods for determining the effective amount of fluoropolymer for use in the concentrates are well known in the art.

The AR-AFFF concentrates may be produced at any suitable strength, including, but not limited to, 1, 3 and 6% (w/w) foam concentrates, which are concentrations that are typical for commercial use. Concentrates that are less than 1% (w/w) or greater than 6% (w/w) also may be prepared. As used herein, the lowest numbered strength for the concentrate used indicates the most concentrated product, i.e., the percent designation refers to the proportioning rate of foam concentrate to water. Accordingly, one part of 1% concentrate used with 99 parts water gives 100 parts of use strength pre-mix; similarly, three parts 3% concentrate and 97 parts water gives 100 parts of pre-mix. As used herein, the term "water" may include pure, deionized or distilled water, tap or fresh water, sea water, brine, or an aqueous or water-containing solution or mixture capable of serving as a water component for the fire fighting composition.

Typical components used for preparing AR-AFFF concentrates are shown in the table below, together with typical % concentrations (w/w).

| Component | % by weight |
| --- | --- |
| High MW fluorinated polymer (HMW-FP) | 0.2-10 |
| Amphoteric Hydrocarbon Surfactant | 0-3 |
| Anionic Hydrocarbon Surfactant | 2-10 |
| Nonionic Hydrocarbon surfactant | 0-5 |
| Fluorochemical Surfactant | 0-0.4 |
| Foam aids including glycol ethers | 0-15 |
| Freeze protection package | 0-45 |
| Sequestering, buffer, corrosion package | 0-5 |
| Polymeric film formers | 0-2 |
| Biocides, antimicrobial | 0-0.1 |
| Electrolytes | 0-3 |
| Polymeric foam stabilizers and thickeners | 0-10 |
| Water | Balance |

The above components would be reduced or increased accordingly relative to the 3% liquid concentrate to prepare 6% and 1% synthetic liquid foam concentrates, or other concentrate levels. Thus, for a 1% concentrate, the above amounts may be increased by a factor of 3, whereas for a 6% concentrate the above amounts may be reduced by half.

Fluoropolymer Component

The high molecular weight fluoropolymers as described herein may be used in an amount to provide a foam concentrate that may have from about 0.005% or less to about 6% or more fluorine by weight of concentrate, more typically from about 0.01% to about 4.5% fluorine by weight of concentrate. The final fire fighting foam or composition may have a fluorine content of from about 0.0003% to about 0.065% fluorine by weight of solution, advantageously about 0.0006% to about 0.05% by weight fluorine from the fluoropolymers being typical, or from 0.001% to about 0.035% by weight fluorine.

The amounts of fluorine from the fluoropolymer will vary in the concentrate depending upon the type of concentrate employed. Thus a 3% concentrate may have from about 0.01% by weight fluorine to about 2% by weight fluorine from the fluoropolymer, advantageously from about 0.02% to about 1.5% by weight, or from about 0.05% to about 1% by weight. A 1% foam concentrate may have from about 0.03% to about 6% by weight fluorine from the fluoropolymer, advantageously from about 0.06% to about 4.5% by weight fluorine being typical, or from about 0.15% to about 3% by weight fluorine. A 6% concentrate may have from about 0.005% to about 1% by weight fluorine from the fluoropolymer, advantageously from about 0.01% to about 0.5% by weight fluorine, or from about 0.025% to about 0.4% by weight fluorine.

Hydrocarbon Surfactants

Amphoteric hydrocarbon surfactants include, but are not limited to, those which contain in the same molecule, amino and carboxy, sulfonic, and sulfuric ester moieties and the like. Higher alkyl ($C_6$-$C_{14}$) betaines and sulfobetaines are included in this category. Commercially available products include Chembetaine CAS (Lubrizol Inc.) and Mirataine CS (Rhodia), both sulfobetaines, and Deriphat 160C (BASF), a $C_{12}$ amino-dicarboxylate. These products are foaming agents and help reduce interfacial tension in water solution.

Anionic hydrocarbon surfactants include, but are not limited to, alkyl carboxylates, sulfates, sulfonates, and their ethoxylated derivatives Alkali metal and ammonium salts are suitable. $C_8$-$C_{16}$ hydrocarbon surfactants are suitable, including, advantageously, $C_8$-$C_{10}$.

Nonionic hydrocarbon surfactants help reduce interfacial tension and solubilize other components, especially in hard water, sea water or brine solutions. They also serve to control foam drainage, foam fluidity, and foam expansion. Suitable nonionic surfactants include, but are not limited to, polyoxyethylene derivatives of alkylphenols, linear or branched alcohols, fatty acids, alkylamines, alkylamides, and acetylenic glycols, alkyl glycosides and polyglycosides, as defined in U.S. Pat. No. 5,207,932 (herein incorporated by reference) and others, and block polymers of polyoxyethylene and polyoxypropylene units.

Fluorocarbon Surfactants

Fluorochemical surfactants are typically single perfluorotail molecules and may have multiple hydrophilic heads. Advantageously, the fluorochemical surfactant contains perfluoroalkyl groups no longer than $C_6$, although $C_8$ and longer fluorosurfactants can also be used. Examples of suitable fluorochemical surfactants include those described in WO/2012/045080.

The quantity of fluorochemical surfactant(s) may be added to increase extinguishing speed and burnback resistance. The presence of the fluoropolymers described herein permits the total fluorochemical surfactant content to be less than one-half of the typical workable levels required when the fluorinated polymers are absent while still meeting UL162 Class B and EN 1568 fire performance. The fluorosurfactant may provide less than about 0.2% or 0.1% fluorine in a 3% concentrate, or less than about 0.006% or 0.003% fluorine, respectively, at the working strength. Fluorine content provided by any fluorosurfactant in the final or working fire fighting composition may be less than 0.002% or even 0.001% fluorine by weight of the working composition.

Foam Aids

Foam aids may be used to enhance foam expansion and drain properties, while providing solubilization and antifreeze action. Useful foam aids are well known in the art and are disclosed, for example, in U.S. Pat. Nos. 5,616,273; 3,457,172; 3,422,011 and 3,579,446, which are herein incorporated by reference.

Typical foam aids include alcohols or ethers such as ethylene glycol monoalkyl ethers, diethylene glycol monoalkyl ethers, propylene glycol monoalkyl ethers, dipropylene glycol monoalkyl ethers, triethylene glycol monoalkyl ethers, 1-butoxyethoxy-2-propanol, glycerine, and hexylene glycol.

Freeze Protection Package

The freeze protection package is used to prevent the concentrate freezing or becoming unusably viscous at low temperatures. Typical components include glycerine, ethylene glycol, diethylene glycol, and propylene glycol. Other potential components include salts and other solids which reduce the freezing point of the concentrate, such as calcium, potassium, sodium and ammonium chloride and urea.

Sequestering, Buffer, and Corrosion Package

The components of the sequestering, buffer, and corrosion package, include agents that sequester and chelate metal ions. Examples include polyaminopolycarboxylic acids, ethylenediaminetetraacetic acid, citric acid, tartaric acid, nitrilotriacetic acid, hydroxyethylethylenediaminetriacetic acid and salts thereof. Buffers are exemplified by Sorensen's phosphate or McIlvaine's citrate buffers. The nature of the corrosion inhibitors is limited only by compatibility with other formula components. Typical corrosion inhibitors include ortho-phenylphenol, toluyl triazole, and many phosphate ester acids.

Polymeric Film Former

These water-soluble polymeric film formers, dissolved in AR-AFFF agents, precipitate from solution when the bubbles contact polar solvents and fuel, and form a vapor-repelling polymer film at the solvent/foam interface, preventing further foam collapse. Examples of suitable compounds include thixotropic polysaccharide gums as described in U.S. Pat. Nos. 3,957,657; 4,060,132; 4,060,489; 4,306,979; 4,387,032; 4,420,434; 4,424,133; 4,464,267, 5,218,021, and 5,750,043, which are herein incorporated by reference. Suitable commercially available compounds are marketed as Rhodopol, Kelco, Keltrol, Actigum, Cecal-gum, Calaxy, and Kalzan.

Gums and resins useful as film formers include acidic gums such as xanthan gum, pectic acid, alginic acid, agar, carrageenan gum, rhamsam gum, welan gum, mannan gum, locust bean gum, galactomannan gum, pectin, starch, bacterial alginic acid, succinoglucan, gum arabic, carboxymethylcellulose, heparin, phosphoric acid polysaccharide gums, dextran sulfate, dermantan sulfate, fucan sulfate, gum karaya, gum tragacanth and sulfated locust bean gum.

Neutral polysaccharides useful as film formers include: cellulose, hydroxyethyl cellulose, dextran and modified dextrans, neutral glucans, hydroxypropyl cellulose, as well, as other cellulose ethers and esters. Modified starches include starch esters, ethers, oxidized starches, and enzymatically digested starches.

Antimicrobials and Preservatives

These components may be used to prevent biological decomposition of natural product based polymers incorporated as polymeric film formers. Examples include Kathon CG/ICP (Rohm & Haas Company) and Givgard G-4 40 (Givaudan, Inc.), and are disclosed in U.S. Pat. No. 5,207,932, which is herein incorporated by reference. Additional preservatives are disclosed in U.S. Pat. Nos. 3,957,657; 4,060,132; 4,060,489; 4,306,979; 4,387,032; 4,420,434; 4,424,133; 4,464,267, 5,218,021, and 5,750,043.

Electrolytes

Electrolytes may be added to AR-AFFF agents to balance the performance of such agents when proportioned with water ranging from soft to very hard, including sea water or brine, and to improve agent performance in very soft water. Typical electrolytes include salts of monovalent or polyvalent metals of Groups 1, 2, or 3, or organic bases. The alkali metals particularly useful are sodium, potassium, and lithium, or the alkaline earth metals, especially magnesium, calcium, strontium, and zinc or aluminum Organic bases might include ammonium, trialkylammonium, bis-ammonium salts or the like. The anions of the electrolyte are not critical, except that halides may not be desirable due to metal corrosion. Sulfates, bisulfates, phosphates, nitrates and the like are commonly used. Examples of polyvalent salts include magnesium sulfate and magnesium nitrate.

Polymeric Foam Stabilizers and Thickeners

Concentrates containing fluoropolymers of the type described herein typically do not contain polymeric foam stabilizers and thickeners, but such components may be included if desired. These components can be optionally incorporated to enhance the foam stability and foam drainage properties. Examples of polymeric stabilizers and thickeners include partially hydrolyzed protein, starches, polyvinyl resins such as polyvinyl alcohol, polyacrylamides, carboxyvinyl polymers, polyvinyl polypyrrolidone, and poly (oxyethylene) glycol.

High MW perfluorinated polymers of the type described herein may be used with commercially available synthetic surfactant concentrates to prepare foam concentrates. The commercially available surfactant concentrates are marketed worldwide and include those available from Chemguard, Kidde, and Tyco. These products include: Class A foams (CLASS A PLUS and SILVEX), excellent for extinguishing forest fires, structural fires, and tire fires; high expansion foams sold under the names HI-EX, EXTRA, C2, and VEE-FOAM; vapor suppressant foam sold by Chemguard as VRC foam; bomb foam, a 6% product sold by Chemguard as AFC-380.

Synthetic surfactant concentrates listed as "wetting agents" by Underwriters Laboratory may also be included as base surfactant mixtures for preparing AR-AFFF concentrates. Products listed by UL as "wetting agents" are as follows: Fire Strike by Biocenter Inc.; Bio-Fire by Envirorenu Technologies LLC; Enviro-Skin 1% by Environmental Products Inc.; F-500 by Hazard Control Technologies Inc.; Knockdown by National Foam Inc.; Phos-Chek WD881 by Solutia Inc.; Flameout by Summit Environmental Corp. Inc. Micro-Blazeout by Verde Environmental Inc.; Bio-solve by Westford Chemical Corp.

A specific example of an AR-AFFF concentrate prepared using the fluorinated polymers described herein has the following components:

| | |
|---|---|
| Water | 66.7 |
| Magnesium sulfate | 1.2 |
| Fluoro surfactant 1 | 0.3 |
| FPS-1 | 3.5 |
| Fluoro surfactant 2 | 1.5 |
| Sulfobetaine | 2.0 |
| Sodium octyl sulfate | 4.0 |
| Sodium decyl sulfate | 14.0 |
| Xanthan gum derivative 1 | 0.5 |
| Xanthan gum derivative 2 | 0.2 |
| Hexylene glycol | 6.0 |

Use of AR-AFFF Concentrates

Concentrate prepared as described above may be mixed with water, typically as a 3% solution, and foamed using foaming devices well known in the art. As water under pressure passes through a fire hose, typically 3 percent by volume of the concentrate composition is inducted into the hose line by the Venturi effect to form a foam solution of the concentrate diluted with water. The solution becomes aerated to produce a finished foam by use of an air-aspirating nozzle located at the outlet end of the hose. A foam solution stored for any length of time prior to aeration is known as a foam premix and can likewise be aerated to produce a finished foam. Equipment which can be used to produce and apply these aqueous air-foams are known in the art and also are described in publications by the National Fire Protection Association.

The concentrate, upon dilution with water and aeration, produces an aqueous film-forming foam which is applied to a body of flammable liquid such as a spill or pool which is burning or subject to ignition. The foam extinguishes the burning liquid, and prevents further ignition by providing a blanket to cover the fuel surface and excluding air.

Preferably, the compositions are introduced into a fire or flame in an amount sufficient to extinguish the fire or flame. One skilled in the art will recognize that the amount of extinguishing composition needed to extinguish a particular hazard will depend upon the nature and extent of the hazard.

EXAMPLES

Example 1: Preparation of High Molecular Weight Perfluoroalkyl Functionalized Polyacrylamide A. Preparation of Perfluoroalkylamine Commercially available perfluorohexyl ethyl iodide is reacted with cysteamine to introduce a terminal amine:

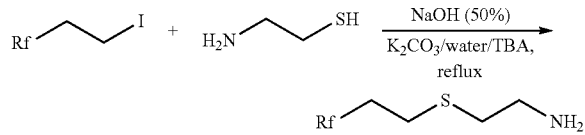

Cysteamine hydrochloride (27 g, 0.24 mol) was added to a 1-neck flask containing a stirrer bar. Water (75 g) and sodium hydroxide (19 g, 50%, 0.24 mol) were added to the flask. The mixture was stirred for a half hour at room temperature followed by addition of potassium carbonate (16.4 g, 0.12 mol), tert-butanol (125 g) and perfluorohexyl ethyl iodide (75 g, 0.16 mol). A reflux condenser was fitted to the flask and the temperature was raised to 82° C. The mixture was mixed overnight (12 hours). Gas chromatographic analysis showed that conversion of perfluorohexyl ethyl iodide exceeded 99%. Stirring was stopped and the mixture cooled to 40° C. for separation. Two clear phases were observed and the bottom aqueous layer was discarded. The top organic layer was transferred to a distillation flask. Under reduced pressure (15 mbar) tert-butanol, water and unreacted perfluorohexyl ethyl iodide were distilled off while the temperature gradually raised to 70° C. Dimethylformamide (DMF, 100 g) was added during the vacuum evaporation to maintain the product in liquid form, followed by partial evaporation of the DMF. The perfluoroakylamine amine product (RfSN, 120 g) was produced as a white or light yellow DMF solution and was used in the next reaction without further purification.

Alternatively, 2-aminoethanol can be used to generate an ether perfluoroalkylamine:

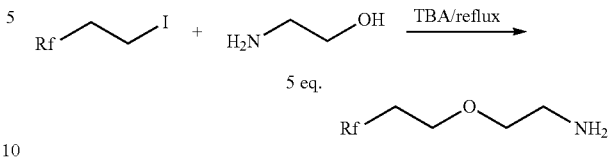

Perfluorohexyl ethyl iodide (50 g, 0.11 mole), ethanolamine (32.8 g, 0.54 mole) and tert-butanol (150 g) were mixed in a flask equipped with a reflux condenser. The mixture was heated under reflux at 82° C. for 4 hours, after which tert-butanol was removed under reduced pressure. THF was added to the remaining mixture, after which the bottom layer was discarded and the top layer was heated to remove THF. The ether perfluoroalkylamine product RfON (24 g, 56%) was obtained as a light yellow liquid.

B. Preparation of Perfluoroalkyl Functionalized Acrylamide

In the next step, the perfluoroalkyl amine is converted to a functionalized acrylamide monomer by reacting with acryloyl chloride.

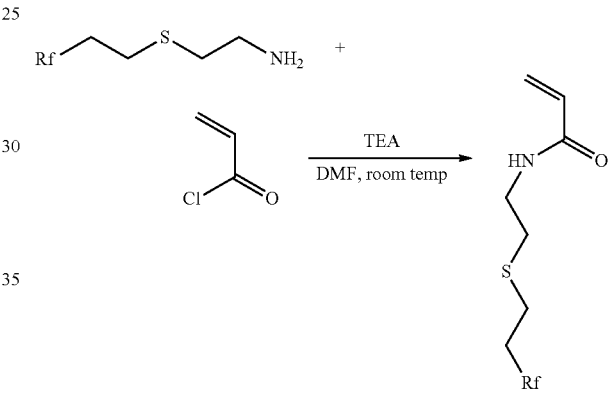

A single neck flask equipped with a stirring bar was charged with the perfluoroakylamine amine product of step A above (RfSN, 18.5 g, 54% actives, 0.024 mol), DMF (10 g) and triethylamine (TEA, 3.6 g, 0.036 mol). Acryloyl chloride (3.2 g, 0.036 mol) was added dropwise with stirring. After four hours stirring at room temperature, GC analysis confirmed that conversion of perfluoroakylamine amine was complete. Ethyl acetate (40 g) and MgSO$_4$ (20 g of a 10% solution in water) were added to the mixture and stirring continued for 10 minutes. The reaction mixture was allowed to stand for an additional 30 minutes, followed by separation of the top organic layer from the bottom aqueous layer. The organic layer was washed with MgSO$_4$ solution (20 g of a 10% solution in water) and dried under vacuum. A light yellow viscous liquid was obtained (10.5 g, 93% yield).

During polymerization, the prepared perfluoro monomer is copolymerized with acrylamide in the presence of perfluorohexyl ethyl thiol as chain transfer agent and an azo initiator.

In an alternative procedure, the reaction can be carried out in tetraglyme solution. Thus, a single neck flask equipped with a stirring bar was charged with the perfluoroakylamine amine product of step A above (RfON, 10.0 g, 0.025 mol), tetraglyme (20.0 g) and triethylamine (TEA, 2.46 g, 0.025 mol). Acryloyl chloride (3.34 g, 0.037 mol) was added dropwise with stirring. After four hours stirring at room temperature, a cloudy and homogenous mixture was formed. The mixture was used in the next polymerization step without purification.

Alternatively, the perfluoroalkylamine can be converted to a functionalized acrylamide monomer by reacting with t-butyl acrylate:

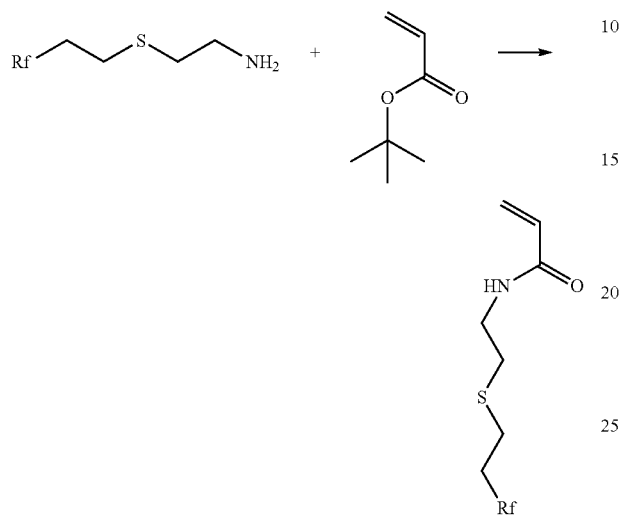

To a beaker was added RfSN/DMF solution (7.5 g, containing RfSN 2.5 g, 0.0052 mol). Molecular sieves were added to dry the mixture. Tert-butyl acrylate (1.5 g, 0.012 mol) was added to a single neck flask and heated to 65° C. While stirring, the dried RfSN/DMF solution was added dropwise into the tert-butyl acrylate. It was observed that the reaction mixture gradually became cloudy. After four hours reaction, gas chromatographic analysis indicated complete conversion of RfSN and the appearance of the desired product RfSNA. The reaction mixture was used in later experiments without further purification.

C. Polymerization

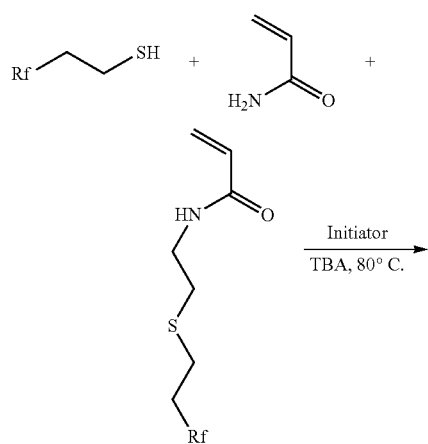

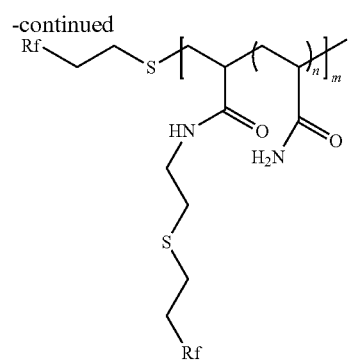

A 1 liter flask was charged with the two monomers: perfluoroalkyl functionalized acrylamide (120 g, 0.25 mol) and acrylamide (235 g, 3.3 mol), and a chain transfer agent (perfluorohexyl ethyl mercaptan, 6.76 g, 0.018 mol), dissolved in 566 g tert-butanol at 35° C. A 4-neck reactor equipped with agitator, thermometer, equilibrium dropping funnel, reflux condenser, nitrogen inlet and outlet was charged with tert-butanol (60 g) and an azo initiator solution (71.8 g) was loaded in the dropping funnel. The monomer solution was connected to the 4-neck reactor via peristaltic pump.

After flushing the reactor with nitrogen, 3.60 g of the initiator in the dropping funnel was added to the reactor, and the reactor was then heated under reflux at 80° C. After 5 minutes, initiator feeding was started at a rate of 0.5% to initiator solution per minute. At the same time, monomer feeding was started at a rate of 1% to monomer solution per minute. The reaction solution changed from clear to murky within 5 minutes from initiation. After 70% of the monomer solution had been added, the reflux condenser was changed to a distillation condenser to remove tert-butanol.

Upon completion of addition of both the monomer solution and initiator solution the reaction was maintained at 80° C. for one hour and then the temperature was raised to 105° C. to speed up the removal of tert-butanol. GC analysis indicated the complete conversion of acrylamide. When distillation slowed, a vacuum was applied for complete removal of tert-butanol. After the completion of distillation, water (548 g) and diethyleneglycol mono-butyl ether (DB, 103 g) were added to the reactor. After mixing at 60° C. for two hours, a light yellow homogenous viscous mixture was achieved (FPS-1, 1086 g, with active content of 33%). The weight average molecular weight of the mixture was 20 KDa, m=13.3, n=14.

Example 2: Variation of Molecular Weight and Composition of Perfluoroalkyl Functionalized Polyacrylamide The molecular weight and composition of the perfluoroalkyl functionalized polyacrylamide was varied by varying the relative amounts of the monomers used in the polymerization step as described in Example 1.

A. The protocol described above was followed except that the following amounts of the monomers were used:
RfSNA, 120 g (0.25 mol)
Acrylamide, 235 g (3.3 mol)
perfluorohexyl ethyl mercaptan 5.29 g (0.014 mol)
initiator The resulting polymer had an average molecular weight of 25 KDa, with m=17, n=14.

B. The protocol described above was followed except that the following amounts of the monomers were used:

RfSNA 80 g (0.17 mol)

acrylamide 166 g (2.3 mol)

perfluorohexyl ethyl mercaptan 1.85 g (0.0049 mol)

initiator

The resulting polymer had an average molecular weight of 50 KDa, with m=34, n=14

C. The protocol described above was followed except that the following amounts of the monomers were used:

RfSNA, 9.5 g (0.020 mol)

acrylamide, 80.5 g (1.134 mol)

perfluorohexyl ethyl mercaptan 0.68 g (0.0018 mol)

initiator

The resulting polymer had an average molecular weight of 50 KDa, with m=11.1, n=56.2.

D. In a further example, acrylic acid monomer also was incorporated into the copolymer:

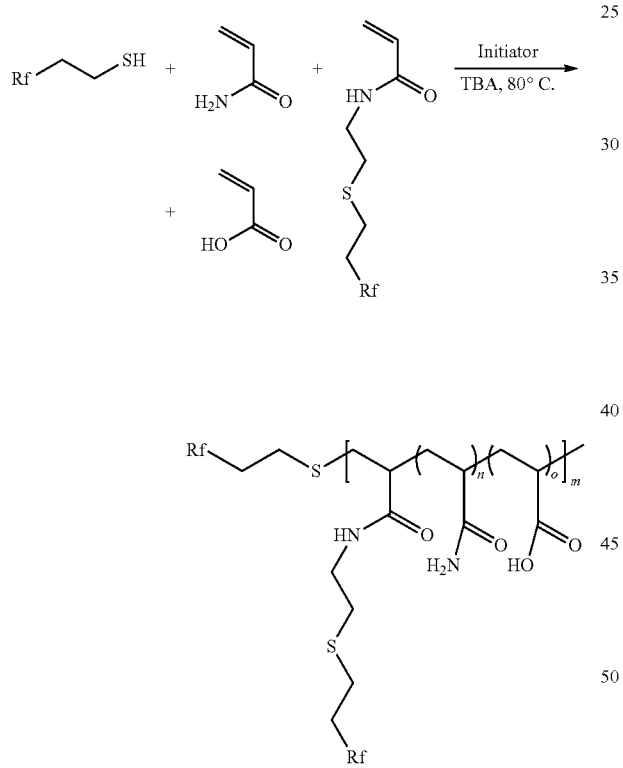

RfSNA, 32.2 g (0.068 mol)

Acrylamide, 47.7 g (0.672 mol)

Acrylic acid, 19.4 g (0.269 mol)

perfluorohexyl ethyl mercaptan 0.75 g (0.002 mol)

initiator

The resulting polymer had an average molecular weight of 50 KDa, with m=34, n=10 and o=4.

E. In a further example, acrylic acid monomer also was incorporated into the copolymer via unreacted acryloyl chloride from Example 1 Step B above:

Polymer with RfONA Units

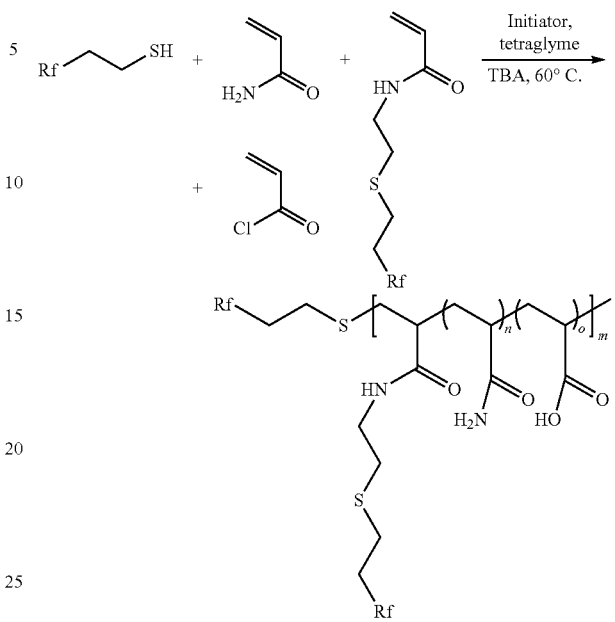

Water (1.5 g, 0.083 mol) and TBA (48.5 g) were added to the product of Example 1 Step B above, which contained RfONA (11.3 g, 0.025 mol) and unreacted acryloyl chloride (1.11 g, 0.012 mol). Acrylamide (24 g, 0.338 mol) was dissolved in 75 g TBA and then added to the mixture. Mercaptan (0.27 g, 0.0007 mol) was added subsequently. The mixture was transferred to a nitrogen protected three neck flask. Initiator was added and the mixture was heated to 60° C. while stirring. After overnight reaction, TBA was removed under vacuum. The polymer in tetraglyme solution (58 g, 60% actives) was obtained as an opaque viscous liquid. The weight average molecular weight of the mixture was 50 KDa, m=34.1, n=13.8, and o=0.5.

Example 3: Foam Stability on Isopropyl Alcohol (IPA) Test

In a foam stability test (Table 1), foam is produced by shaking the sample solution. See Martin, "Fire-Fighting Foam Technology" in: *Foam Engineering: Fundamentals and Applications* (Wiley, 2012, 411-457). The foam is subsequently applied to cover the IPA in a beaker. Due to the contamination effect of IPA, the foam blanket gradually is corrupted and IPA is exposed to air. The times when 1%, 50%, and 90% surface are exposed to air are recorded. The longer the time that the foam blanket covers the IPA, the better the sample. The product from Example 1, [FPS-1] was compared to commercially available competitive fluoropolymer products Chemguard FP-5103 (Chemguard, Mansfield, Tex.) and Dynax DX5022 [no dash] (Dynax, Pound Ridge, N.Y.). The comparisons shown below are made on an equal actives basis. The results show the efficiency of fluorine use when the measured fluorine content of each HMW-FP is considered.

TABLE 1

Foam stability on IPA

| | % F (by wt., product basis, measured) | 1% exposure | 50% exposure | 90% exposure |
|---|---|---|---|---|
| FP5103 | 4.3 | 0:01:30 | 0:08:00 | 0:23:00 |
| [FPS-1] | 6.0 | 2:00:00 | 2:20:00 | 4:00:00 |
| DX5022 | 6.2 | 0:06:00 | 0:19:00 | 0:40:00 |

Example 4: Isopropyl Alcohol—Solubility Limit Test

The IPA-water solubility limit test is used to determine the solubility limit of an AR-AFFF component in a IPA/water mixture as the amount of IPA is increased. IPA is gradually added to a sample solution and the amount of IPA added when the sample changes from transparent to opaque is recorded. A lower water solubility limit indicates a better sample.

TABLE 2

IPA-water solubility limit

| | Sample solution | Solubility Limit |
|---|---|---|
| FP5103 | Yellow, opaque | 23.6% |
| [FPS-1] | White, transparent | 0.0%* |
| DX5022 | Yellow, transparent | 33.3% |

*Becomes opaque immediately when adding IPA.

Example 5: Determination of Critical Micelle Concentration and Surface Tension

Fluoropolymer [FPS-1] (Example 1) was dissolved in deionized water and critical micelle concentration (CMC) and surface tension were studied. FIG. 1 shows the CMC curve obtained. Considering the higher concentrations, the low ultimate surface tension demonstrates excellent surfactant properties, despite the high molecular weight, and the subtle inflection point indicates a saturated solution state and gives a reference point for the use level in a formulation.

Example 6: Fire Testing of Foam Compositions Using High Molecular Weight Fluoropolymers Fluoropolymer [FPS-1] (Example 1) was used to prepare an AR-AFFF concentrate, and the performance of foam prepared from the concentrate was compared to foam from concentrates containing commercially available competitive fluoropolymer products Chemguard FP-5103 (Chemguard, Mansfield, Tex.) and Dynax DX5022 (Dynax, Pound Ridge, N.Y.).

Equivalent amounts of each of the three fluoropolymers was added to the same concentrate base, as shown in the table below, and the pH was adjusted to pH 7.7±0.3:

| Component | wt % |
|---|---|
| water | 66.7 |
| Magnesium sulfate | 1.2 |
| Fluoro surfactant 1 | 0.3 |
| [FPS-1]HMW-FP | 3.5 |
| Fluoro surfactant 2 | 1.5 |

-continued

| Component | wt % |
|---|---|
| Sulfobetaine | 2.0 |
| Sodium octyl sulfate | 4.0 |
| Sodium decyl sulfate | 14.0 |
| Xanthan gum derivative 1 | 0.5 |
| Xanthan gum derivative 2 | 0.2 |
| Hexylene glycol | 6.0 |

In the UL 162 test, the control and extinguishment time must be less than 5:00 minutes to pass the fire test. At 5 min after re-ignition, the exposed surface should be less than 20% to pass the test. The results for the above concentrate proportioned at 3% are shown in tables 3 and 4 below:

TABLE 3

Fire-test UL 162 S 10 on IPA

| HMW-FP Component | Control | Ext. | Burn-back |
|---|---|---|---|
| FP-5103 | 1'10" | 2'22" | 4% |
| [FPS-1] | 45" | 1'41" | 2% |
| DX-5022 | 54" | 1'58" | 3% |

TABLE 4

Fire-test UL 162 S 10 on heptane

| Component | Control | Ext. | Burn-back |
|---|---|---|---|
| FP-5103 | 1'36" | 2'20" | <1% |
| [FPS-1] | 1'42" | 2'07" | <1% |
| DX-5022 | 1'17" | 1'52" | 2% |

The concentrates were also tested in European standard EN 1568-4. In this standard the rating are determined as shown in the following table (time shown in minutes):

| Extinguishing performance class | Burn-back resistance level | Extinction time not more than | Burn-back time not less than |
|---|---|---|---|
| I | A | 3 | 15 |
| | B | 3 | 10 |
| | C | 3 | 5 |
| II | A | 5 | 15 |
| | B | 5 | 10 |
| | C | 5 | 5 |

The comparative results are shown in Table 5:

TABLE 5

Fire-test EN 1568-4 on IPA

| HMW-FP Component | Control | Ext. | Rating | Burn-back | Rating |
|---|---|---|---|---|---|
| FP-5103 | 1'55" | 2'53" | Class I | 12'02" | I B |
| [FPS-1] | 16" | 1'12" | Class I | 15'44" | I A |
| DX-5022 | 1'36" | 2'23" | Class I | 12'32" | I B |

The concentrates were also tested in European standard EN 1568-3. In this standard the rating are determined as shown in the following table (time shown in minutes):

EN 1568-3 Maximum Extinction Times and Minimum Burn-Back Times
Times in minutes

| Extinguishing performance class | Burn-back resistance level | Gentle application test | | Forceful application test | |
|---|---|---|---|---|---|
| | | Extinction time not more than | Burn-back time not more than | Extinction time not more than | Burn-back time not more than |
| I | A | Not applicable | | 3 | 10 |
| | B | | 15 | 3 | Not applicable |
| | C | | 10 | 3 | |
| | D | | 5 | 3 | |
| I | A | Not applicable | | 4 | 10 |
| | B | | 15 | 4 | |
| | C | | 10 | 4 | |
| | D | | 5 | 4 | |
| III | B | 5 | 15 | Not applicable | |
| | C | 5 | 10 | | |
| | D | 5 | 5 | | |

The comparative results are shown in Table 6:

TABLE 6

| Fire-test EN 1568-3 on heptane | | | | | |
|---|---|---|---|---|---|
| HMW-FP Component | method | Control | Ext. | Burn-back | Rating |
| FP-5103 | forceful | 56" | 3'11" | 4'21" | II C |
| | gentle | 58" | 2'44" | 13'15" | |
| [FPS-1] | forceful | 1'35" | 3'06" | 3'34" | II C |
| | gentle | 56" | 2'18" | 11'22" | |
| DX-5022 | forceful | 1'00" | 3'24" | 5'29" | II C |
| | gentle | 1'06" | 2'07 | 10'17" | |

What is claimed is:

1. An aqueous firefighting composition concentrate comprising an effective amount of a fluoropolymer having the formula I

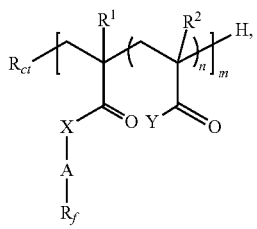

wherein:
$R_f$ is a $C_4$-$C_6$ perfluoroalkyl group;
A is a bivalent linker moiety;
$R_{ct}$ is a chain transfer agent;
$R^1$ is H or methyl;
$R^2$ is H or methyl;
X is NH or O;
Y is $NH_2$ or OR, where R is H or $C_1$-$C_3$ alkyl;
n is 10-50;
m is 5-100;
and said fluoropolymer has a molecular weight of at least about 10,000, and wherein said composition is substantially free of any surfactant containing a perfluoroalkyl group containing more than 6 carbon atoms.

2. The aqueous firefighting composition concentrate according to claim 1, wherein said composition complies with the standard of EN 1568-3.

3. The aqueous firefighting composition concentrate according to claim 1, wherein said composition further comprises an effective amount of one or more components selected from the group consisting of: an amphoteric hydrocarbon surfactant, an anionic hydrocarbon surfactant, a nonionic hydrocarbon surfactant, a $C_6$ fluorochemical surfactant, a foam aid, a freeze protection composition, a composition comprising ion sequestering, buffer, and anti-corrosion components, a polymeric film forming composition, a biocides and antimicrobial composition, an electrolyte composition, and a polysaccharide gum thickener.

4. The aqueous firefighting composition concentrate according to claim 1, wherein $R^1$ and $R^2$ are H.

5. The aqueous firefighting composition concentrate according to claim 1, wherein X is NH.

6. The aqueous firefighting composition concentrate according to claim 1, wherein Y is $NH_2$.

7. The aqueous firefighting composition concentrate according to claim 1, wherein A is $C_1$-$C_{12}$ alkyl optionally interrupted with —S— or —O—.

8. The aqueous firefighting composition concentrate according to claim 1, wherein A is —$(CH_2)_{1-6}$—S—$(CH_2)_{1-6}$—.

9. The aqueous firefighting composition concentrate according to claim 1, wherein A is —$(CH_2)_2$—S—$(CH_2)_2$—.

10. The aqueous firefighting composition concentrate according to claim 1, wherein $R_{ct}$ is an alkyl mercaptan, an aralkyl mercaptan, a perfluoroalkyl alkyl mercaptan, an alkyl halide, an aralkyl halide, or a perfluoroalkyl alkyl halide.

11. The aqueous firefighting composition concentrate according to claim 1, wherein $R_{ct}$ is $C_1$-$C_6$ alkylthio or Rf—$(CH_2)_{2-6}$—S—.

12. The aqueous firefighting composition concentrate according to claim 1, wherein $R_f$ is perfluorohexyl.

13. The aqueous firefighting composition concentrate according to claim 1, wherein $R_f$ is perfluorohexyl, A is Rf—$(CH_2)_2$—S—$(CH_2)_2$—, $R_{ct}$ is Rf—$(CH_2)_2$—S—, R, $R^1$ and $R^2$ are H, X is NH, and Y is $NH_2$.

14. The aqueous firefighting composition concentrate according to claim 1, wherein said fluoropolymer has a molecular weight less than 100,000.

15. The composition according to claim 3, wherein said composition comprises an amphoteric hydrocarbon surfactant in an amount up to 3% w/w.

16. The composition according to claim 3, wherein said composition comprises an anionic hydrocarbon surfactant in an amount of 2-20% w/w.

17. The composition according to claim 3, wherein said composition comprises a nonionic hydrocarbon surfactant in an amount up to 5% w/w.

18. The composition according to claim 3, wherein said composition comprises a C6 fluorochemical surfactant in an amount up to 0.4% w/w.

19. The composition according to claim 3, wherein said composition comprises a foam aid in an amount up to 15% w/w.

20. The composition according to claim 1, wherein said composition comprises a freeze protection composition in an amount up to 45% w/w.

21. The composition according to claim 1, wherein said composition comprises ion sequestering, buffer, and anti-corrosion components in an amount up to 5% w/w.

22. The composition according to claim 1, wherein said composition comprises a polymeric film forming composition in an amount up to 2%.

23. The composition according to claim 1, wherein said composition comprises biocides and/or antimicrobials in an amount up to 0.1% w/w.

24. The composition according to claim 1, wherein said composition comprises electrolytes in an amount up to 3% w/w.

25. The composition according to claim 1, wherein said composition comprises at least one polysaccharide gum thickener in an amount up to 10% w/w.

\* \* \* \* \*